(12) United States Patent
Belghiti

(10) Patent No.: US 10,083,220 B2
(45) Date of Patent: Sep. 25, 2018

(54) DESIGNING A CHOROPLETH MAP

(71) Applicant: DASSAULT SYSTEMES, Velizy Villacoublay (FR)

(72) Inventor: Ismael Belghiti, Paris (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 206 days.

(21) Appl. No.: 14/980,168

(22) Filed: Dec. 28, 2015

(65) Prior Publication Data

US 2016/0188697 A1 Jun. 30, 2016

(30) Foreign Application Priority Data

Dec. 27, 2014 (EP) ..................................... 14307193

(51) Int. Cl.
*G06F 7/02* (2006.01)
*G06F 17/30* (2006.01)
(Continued)

(52) U.S. Cl.
CPC ........ *G06F 17/30598* (2013.01); *G06F 17/16* (2013.01); *G06F 17/3053* (2013.01);
(Continued)

(58) Field of Classification Search
CPC ........... G06F 17/30241; G06F 17/3025; G06F 17/30598; G06F 17/3053; G06F 17/30321; G06F 17/16; G06N 99/005; G06K 9/6223
See application file for complete search history.

(56) References Cited

U.S. PATENT DOCUMENTS

2009/0077221 A1\* 3/2009 Eisenstadt et al.
2017/0337195 A1\* 11/2017 Rinearson ............ G06Q 10/101

FOREIGN PATENT DOCUMENTS

WO WO 2014/060050 A1 4/2014

OTHER PUBLICATIONS

"Using the K-Means Clustering Algorithm to Classify Features for Choropleth Maps," Polczynski, Mark and Polczynski, Michael, Cartographica vol. 49 No. 1, Spring 2014. (Year: 2014).\*
(Continued)

*Primary Examiner* — Bruce M Moser
(74) *Attorney, Agent, or Firm* — Oblon, McClelland, Maier & Neustadt, L.L.P.

(57) ABSTRACT

The invention notably relates to a computer-implemented method of designing a choropleth map, wherein the method comprises providing a map, and a number (n) of numerical values $(x_1, \ldots, x_n)$ that represent a statistical variable at respective areas of the map; computing the optimal K-means clustering of the numerical values for a predetermined number of clusters, wherein the computing includes iterating, a number of times corresponding to the predetermined number of clusters, a linear-time Row Minima Searching algorithm applied to a square matrix of order equal to the number of numerical values; assigning a respective coloration to each cluster of the computed clustering; and at all areas of the map at which a respective numerical value is provided, applying the coloration assigned to the cluster to which the respective numerical value belongs.
Such a method improves the design of a choropleth map.

11 Claims, 2 Drawing Sheets

(51) Int. Cl.
*G06N 99/00* (2010.01)
*G06F 17/16* (2006.01)
*G06K 9/62* (2006.01)

(52) U.S. Cl.
CPC ..... *G06F 17/30321* (2013.01); *G06K 9/6223* (2013.01); *G06N 99/005* (2013.01)

(56) References Cited

OTHER PUBLICATIONS

"The interactive digitizing of polygons and the processing of polygons in a relational database," McIntosh, John F. SIGGRAPH '78 Proceedings of the 5th annual conference on Computer graphics and interactive techniques, 1978 (Year: 1978).*

"An Efficient Parallel Algorithm for the row Minima of a Totally Monotone Matrix," Atallah, Mikhail J. et al, SODA '91 Proceedings of the second annual ACM-SIAM symposium on Discrete algorithms, 1991 (Year: 1991).*

Extended European Search Report dated Jul. 9, 2015 in European Patent Application No. 14307191.8.

Extended European Search Report dated Jul. 9, 2015 in European Patent Application No. 14307192.6.

Extended European Search Report dated Jul. 9, 2015 in European Patent Application No. 14307193.4.

Cromley R G.: "A comparison of optimal classification strategies for choroplethic displays of spatially aggregated data", International Journal of Geographical Information Systems; vol. 10, No. 4, Jun. 1996, pp. 405-424, XP009117383.

Wu X: "Optimal quantization by matrix searching", Journal of Algorithms, vol. 12, 1991, pp. 663-673; XP055199532.

Wu X, et al: "Quantizer monotonicities and globally optimal scalar quantizer design", IEEE Transactions on Information Theory, vol. 39, No. 3, May 1993, pp. 1049-1053, XP002233309.

Xu M: "K-means based clustering and context quantization", Dissertation, Computer Science, University of Joensuu, 2005, XP055199559, Retrieved from the Internet: URL:ftp.cs.joensuu.fi/pub/franti/papers/Xu/Xu_thesis.pdf.

Chen D Z., et al.: "Geometric algorithms for the constrained 1-D K-means clustering problems and IMRT applications", Lecture Notes in Computer Science, vol. 4613, Aug. 2007, pp. 1-13, XP019065991.

Brun L, et al.: "Color quantization (Chapter 9)", Digital Color Imaging Handbook, 2003, CRC Press, XP055199557.

Aggarwal A, et al.: "Geometric applications of a matrix-searching algorithm", Algorithmica, vol. 2, Nov. 1987, pp. 195-208, XP055199088.

Murray A T., et al.: "Integrating attribute and space characteristics in choropleth display and spatial data mining", International Journal of Geographical Information Science, vol. 14, No. 7, Oct. 2000, pp. 649-667, XP055199771.

Nielsen F, et al.: "Optimal interval clustering: Application to Bregman clustering and statistical mixture learning", IEEE Signal Processing Letters, vol. 21, No. 10, Oct. 2014, pp. 1289-1292, XP011552926.

Wang H, et al.: "Ckmeans.1d.dp: Optimal k-means clustering in one dimension by dynamic programming", The R Journal, vol. 3, No. 2, Dec. 2011, pp. 29-33, XP055199020.

Hilferink M: "Fisher's natural breaks classification", ObjectVision wiki page, version 01.02.2014 at 14:49, Feb. 1, 2014, XP055199025, Retrieved from the Internet: URL:http://wiki.objectvision.nl.index.php?title=Fisher%27s_Natural_Breaks_Classication&oldid=1388.

Soong F K., et al.: "Optimal quantization of LSP parameters", IEEE Transactions on Speech and Audio Processing, vol. 1, No. 1, 1993, pp. 15-24, XP000358436.

\* cited by examiner

DESIGNING A CHOROPLETH MAP

CROSS-REFERENCE TO RELATED APPLICATIONS

This application claims priority under 35 U.S.C. § 119 or 365 to European Application No. 14307193.4, filed Dec. 27, 2014. The entire teachings of the above application(s) are incorporated herein by reference.

FIELD OF THE INVENTION

The invention notably relates to the field of map design, and notably to a computer-implemented method, a computer program, and a system for designing a choropleth map.

BACKGROUND

Chloropeth maps are often used in Geographic Information Systems (GIS). This concerns the problem of representing on a map a statistical variable whose value on each area of the map is represented by a color intensity. The statistical variable being displayed can be of different natures (population density, number of cars by inhabitant, rainfall, disease proportion).

In this context, the choice of the set of intensities chosen is primordial in this representation. The two main algorithms of the background art used for this choice are *Jenks/Fisher's natural breaks optimization* (described in the articles "*The Data Model Concept in Statistical Mapping*", by Jenks, 1967, and "*On grouping for maximum homogeneity*" by Fisher, 1958) and *Head-tail breaks* (described in the articles "*A comparison study on natural and head/tail breaks involving digital elevation models*" by Lin and Yue, 2013, and "*Head/tail breaks for visualizing the fractal or scaling structure of geographic features*" by Jiang and Bing, 2014, or "*Ht-index for quantifying the fractal or scaling structure of geographic features*"). These solutions are actually based on Cluster Analysis algorithms. Other examples of choropleth map systems that use cluster analysis include documents US20050278182A1, U.S. Pat. No. 8,412,419B1 and U.S. Pat. No. 8,510,080B2.

The design of a chloropeth map relates in a way to quantization (i.e. replacement of an input value by a closest one in a predetermined set of values, according to a predetermined distance). Indeed, areas of the maps are grouped together and the value of the statistical variable for such areas is replaced accordingly by a representative value for the group. This whole framework relates to the more general field of cluster analysis.

Cluster Analysis concerns the task of partitioning a set of objects in groups (called clusters), so that in each group the data are similar (see the article of Jain et al., "*Data Clustering: A Review*"). It appears as a central problem in Data Mining (see the article of Chen et al., "*Data mining: an overview from a database perspective*"), Machine Learning (see the book of Murphy, "*Machine Learning, A Probabilistic Perspective*"), and Large Scale Search (see the article of Goodrum, "*Image Information Retrieval: An Overview of Current Research*"). Cluster Analysis is an important tool for Quantization: assigning a center to each cluster, one has a simple quantization that consists in quantizing each point to the center of its cluster.

The K-means clustering problem is the most famous problem of Cluster Analysis and was introduced by Stuart Lloyd in 1957 at Bell Laboratories, as a technique for Pulse-Code Modulation. The Lloyd algorithm takes as input a collection of p-dimensional points and outputs a partition of these points that aims to minimize the "total distortion". This algorithm is only a heuristic (it does not provide the optimal clustering). But in fact we cannot hope for an exact algorithm since the K-means clustering problem is NP-hard in the non-one-dimensional case. The Lloyd algorithm is nowadays still widely used. Several variants have also been proposed (see J. A. Hartigan (1975), "*Clustering algorithms*", John Wiley & Sons, Inc.").

The one-dimension application is particularly important. One of the most famous algorithms for this problem is actually above-cited Jenks natural breaks optimization developed in 1967 (see the book of Jenks, "*The Data Model Concept in Statistical Mapping*", in International Yearbook of Cartography) and was introduced for cartographic purpose, as mentioned above. As Lloyd algorithm, it is only a heuristic. In 2011 an exact algorithm, called CKmeans, was developed by Wang and Song (see the article of Wang and Wong, "*Optimal k-means Clustering in One Dimension by Dynamic Programming*"). This algorithm is the corner stone of document U.S. Pat. No. 1,543,036A. It runs in time $O(K*n^2)$ where K is the requested number of clusters and n is the number of real numbers. Even more recently (in 2013), Maarten Hilferink has developed a more efficient algorithm and provides an implementation of it. This implementation was actually dedicated to cartography, more precisely for choropleth maps, however the only documentation of this algorithm is a Wikipedia page (Fisher's Natural Breaks Classification, accessible at the following URL at the priority date: wiki.objectvision.nl/index.php/Fisher%27s_Natural_Breaks_Classification).

All these existing methods are however limited because either they do not produce the optimal K-means clustering, or they are too slow. Within this context, there is still a need for an improved solution to design a choropleth map.

SUMMARY OF THE INVENTION

It is therefore provided a computer-implemented method of designing a choropleth map. The method comprises the step of providing a map, and a number of numerical values that represent a statistical variable at respective areas of the map. The method also comprises the step of computing the optimal K-means clustering of the numerical values for a predetermined number of clusters. The computing step includes iterating, a number of times corresponding to the predetermined number of clusters, a linear-time Row Minima Searching algorithm applied to a square matrix of order equal to the number of numerical values. The method also comprises the step of assigning a respective coloration to each cluster of the computed clustering. The method also comprises the step of, at all areas of the map at which a respective numerical value is provided, applying the coloration assigned to the cluster to which the respective numerical value belongs.

The method may comprise one or more of the following:
- the method further comprises providing a predetermined color, and the coloration assigned to a respective cluster is an intensity of the predetermined color that depends on the numerical values of the respective cluster;
- the coloration assigned to a respective cluster is an intensity of the predetermined color that increasingly depends on the value of the center of the respective cluster;
- the numerical values are sorted and indexed accordingly, and the iterating within the computing step includes, at each respective iteration rank, and for each respective index inferior to the number of numerical values, the computation of the minimal total distortion achievable for the subset of numerical values indexed lower than the respective index, with a number of clusters corresponding to the respective iteration rank, according to the linear-time Row Minima Searching algorithm applied to the square matrix;

at each respective iteration rank, and for each respective index inferior to the number of numerical values, for each row index and each column index, the matrix entry corresponds to a sum of the minimal total distortion computed at the previous iteration for the index preceding the row index, and the distortion of the contiguous subset of the numerical values between the row index and the column index;

the method further comprises, at each respective iteration rank, storing indices returned by the Row Minima Searching algorithm;

the method further includes, at the computing step, determining the optimal clustering from the stored indices; and/or determining the optimal clustering from the stored indices comprises iteratively partitioning the numerical values, starting from the last indexed numerical value in the stored indices, wherein at each respective iteration rank, the index of the starting numerical value of the currently formed cluster is equal to the index stored, during the iterating within the computing step, at the iteration of rank equal the predetermined number of clusters minus the respective iteration rank for the row index equal to the index of the last indexed numerical value of the currently formed cluster.

It is further provided a computer program comprising instructions for performing the method.

It is further provided a computer readable storage medium having recorded thereon the computer program.

It is further provided a system comprising a processor coupled to a memory, the memory having recorded thereon the computer program.

It is further provided a choropleth map obtainable by the method.

It is further provided a data storage medium having recorded thereon the choropleth map.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
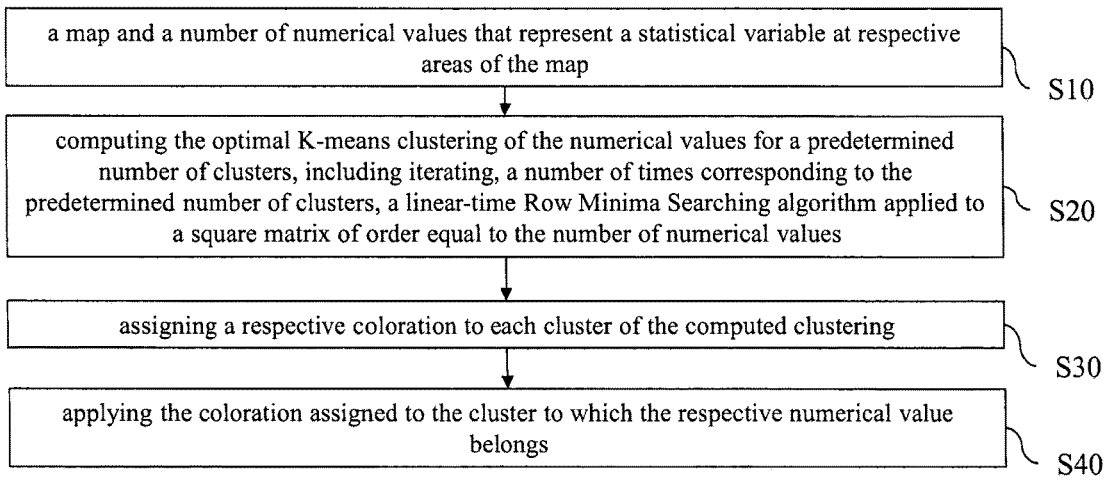
FIG. 1 shows a flowchart of an example of the method.

With reference to the flowchart of FIG. 1, it is proposed a computer-implemented method of designing (e.g. drawing/producing/defining) a choropleth map. The method comprises the step of providing S10 a (e.g. blank and/or geographical) map (e.g. including at least a 2D view of lines representative of a geographic region) and a number (e.g. any number) of numerical values that represent (e.g. values taken by) a statistical variable (i.e. any demographical/geographical/geological/geostrategic/medical/commercial/marketing variable, such as population density, number of cars by inhabitant, rainfall, disease proportion) at respective areas of the map (i.e. the numerical values are each associated to a location of the map representative of a local zone/area of the map, which may thus be provided with a referential for the lines and such locations, e.g. the map being a simple drawing of a geographic region and the numerical values being associated to pixels, or the map being provided as a more complex piece of data including data describing projection of a sphere representing the earth or a part thereof on a square, rectangle, round or elliptic plane, the numerical values being then provided with coordinates corresponding to locations on the projection). The method also comprises the step of computing S20 the optimal K-means clustering of the numerical values for a predetermined number of clusters. The computing step S20 includes iterating, a number of times corresponding to the predetermined number of clusters, a linear-time Row Minima Searching algorithm applied to a square matrix of order equal to the number of numerical values. And the method comprises the steps of assigning (S30) a respective coloration to each cluster of the computed clustering, and at all areas of the map at which a respective numerical value is provided, applying (S40) the coloration assigned to the cluster to which the respective numerical value belongs, thereby adding visual details to the map (that is, the colorations). Such a method improves the design a choropleth map.

Notably, the method allows the clustering S20 of the values of the statistical data to design a choropleth map, as also known and provided by the prior art. Because the method performs such clustering S30 by computing S20 the optimal K-means clustering, the method designs a relatively high quality choropleth map, as widely known from the art of Geographic Information Systems which usually aims for a K-means clustering in order to produce a choropleth map. But most importantly, the method performs such computation S20 by iterating, a number of times corresponding to the predetermined number of clusters, a linear-time Row Minima Searching algorithm applied to a square matrix of order equal to the number of numerical values. Thanks to this specific algorithmic framework implemented by the method, the computation of the optimal K-means clustering is performed fast, as detailed later.

The method is computer-implemented. This means that the steps (or substantially all the steps) of the method are executed by at least one computer, or any system alike. Thus, steps of the method are performed by the computer, possibly fully automatically (e.g. all steps but the providing S10, or, semi-automatically. In examples, the triggering of at least some of the steps of the method may be performed through user-computer interaction (e.g. the providing S10). The level of user-computer interaction required may depend on the level of automatism foreseen and put in balance with the need to implement the user's wishes. In examples, this level may be user-defined and/or pre-defined.

A typical example of computer-implementation of the method is to perform the method with a system adapted for this purpose. The system may comprise a processor coupled to a memory, the memory having recorded thereon a computer program comprising instructions for performing the method. The memory may also store a database, adapted to maintain the data processed by the method. The memory is any hardware adapted for such storage, possibly comprising several physical distinct parts (e.g. one for the program, and possibly one for the database).

Figure 2:
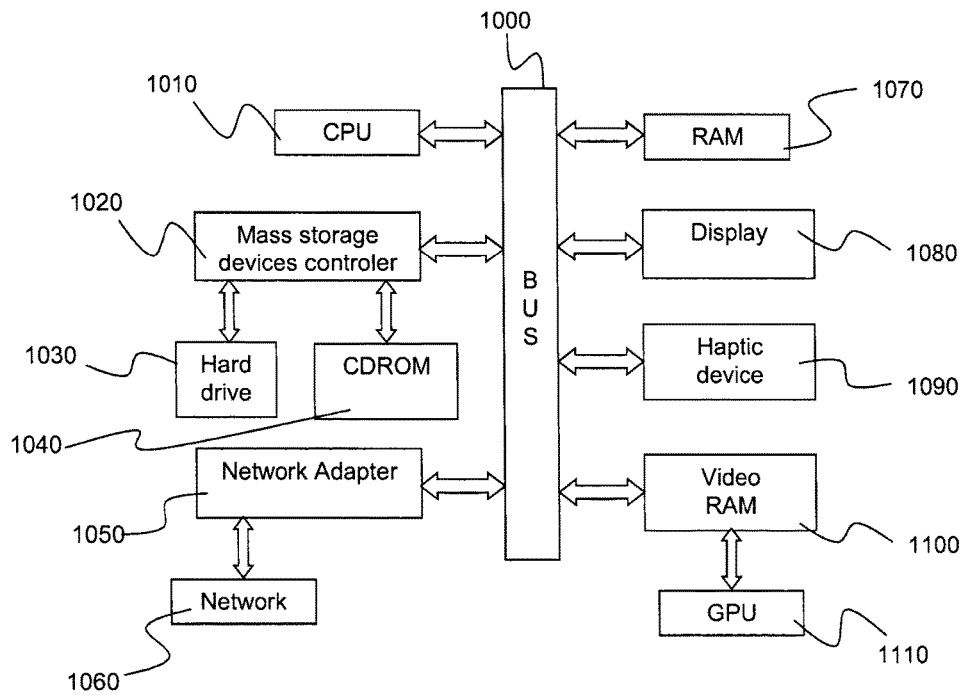
FIG. 2 shows an example of the system.

FIG. 2 shows an example of the system, wherein the system is a client computer system, e.g. a workstation of a user. The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method proposes an improved data clustering algorithm, applied to choropleth map design in specific. But before detailing the algorithmic solution of the method, its context (i.e. the application) is now detailed).

The method is for designing a choropleth map.

Figure 3:
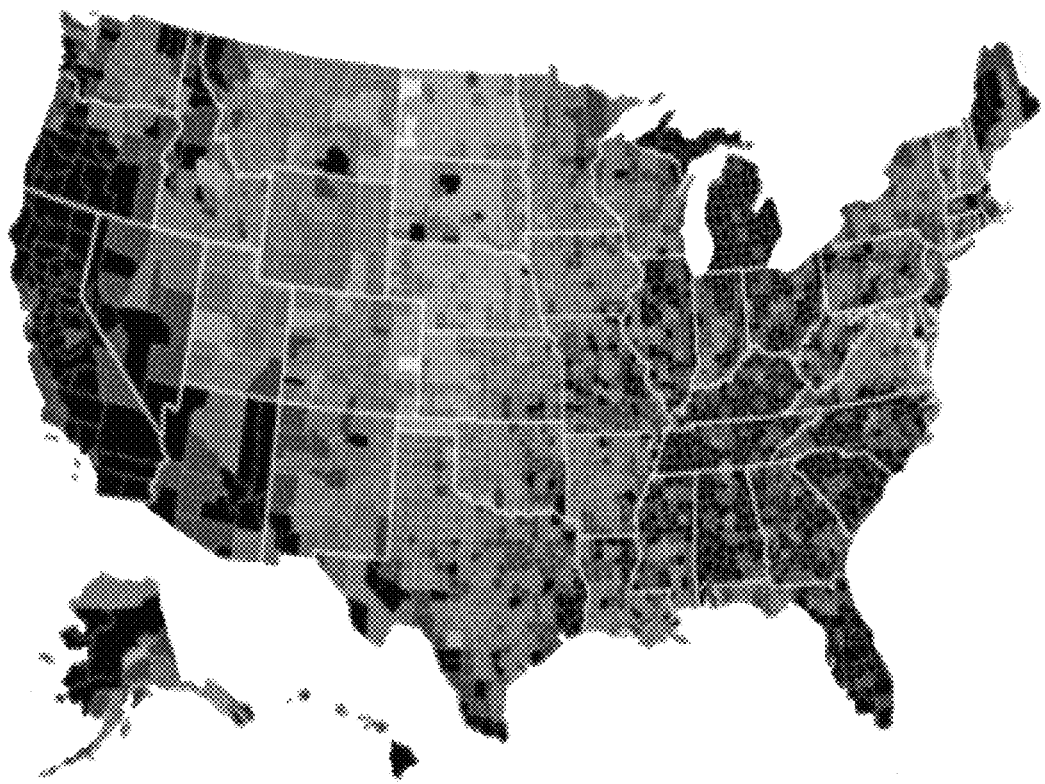
FIG. 3-4 illustrate the method.

As mentioned above and as widely known from the prior art, this type of map is a (typically 2D, but also possibly 3D) view that represents/displays with different coloration (e.g. colors/textures) sub-areas of a geographic area according to the value of a statistical variable/measure at such sub-areas, each coloration being associated to a respective value or contiguous range of the statistic. In this context, the term coloration (e.g. color/texture) designates generally any visual information spread on said sub-area. Typically, the coloration is a color (e.g. RGB or grayscale) whose intensity in an increasing function of the statistical variable. But the coloration may also be a height, proportional to the statistical variable, in the case of a prism map (a specific case of choropleth maps). FIG. 3 shows an example of a choropleth map that may be obtained by the method, with different grayscale intensities assigned to different areas of the map. In general, the design of the choropleth map may be based on a predetermined increasing relationship between a predetermined ordered and one-dimensional set of values of coloration and values of the statistical variable (thus associated to, if not contained in, a one-dimensional ordered domain).

The design of such a map follows in the case of the method the classical pipeline of the prior art. First, the method starts at S10 with a simple contour map (typically blank) and values of a statistical variable associated to respective areas of the map. The goal is to transform such numerical representation of the statistic in a way to obtain a simple and meaningful visualization. This is where the clustering intervenes. Indeed, a choropleth map could theoretically assign a different coloration to each value of the statistical variable, but this would not be heavy on the computational end, this would also not be very meaningful to the user (the map would be too "busy").

As known, K-means clustering is particularly advantageous from a semantic point of view, as it gathers the values of the statistical variable in a meaningful way. The values of the statistical variable are thus clustered by the method with a K-means clustering (the number of clusters depends on the viewer and/or the designer of the map, and it is predetermined in the context of the method), and then each area of the map that was associated to a value of the statistical variable (possibly all areas, depending on the data provided at S10) is now associated to a respective cluster (the cluster of the value of the statistical variable for that area). Now, because the method assigns S30 a respective coloration to each cluster of the computed clustering, the method may produce a choropleth map by S40. This is all very classical and explained extensively in the above-cited prior art.

Any classical way to perform the coloration may be implemented by the method. A classical way is to provide a predetermined color, and then to assign to a respective cluster an intensity of the predetermined color. For example, if the color is provided in RGB, then each respective intensity corresponds to a factor (e.g. between 0 and 1) applied to the RGB weights. The same may be performed for a grayscale color. The intensity of the predetermined color may increasingly depend on the value of the center of the respective cluster. In other words, the center of the clusters (e.g. average value of the statistical variables grouped in the cluster) defines increasingly the intensity applied (i.e. the more intense means the higher the value of the statistical variable for the visualized area).

Many other methods may be applied, such as those described at the following URL (accessible at the priority date):

en.wikipedia.org/wiki/Choropleth_map#Color_progression.

In an example, the method may simply apply different grayscale levels (as on FIG. 3) between 0 (black) and 255 (white). For example, if the result of the clustering provides cluster centers $c_1, \ldots, c_K$ (with $c_1 < c_2 < \ldots < c_K$), the method may apply an affine transformation that maps $c_1$ to 0 (white) and $c_K$ to 255 (black): $\varphi: c_i \to 255*(c_i-c_1)/(c_K-c_1)$.

All this is very classical and need not be further explained.

Now, because the method finds the optimal K-means clustering with a reduced algorithmic complexity (relative to the exact solution algorithms of the prior art, and even relative to reasonable heuristics), it allows designing choropleth maps using the optimal K-means clustering. This is unlike the prior art, which either applies a heuristic that does not lead to the optimal K-means clustering, or is in practice inapplicable (because of a too high complexity). Notably, the method finds the optimal K-means clustering for values of n higher than 1000, e.g. of the order 10000, notably for values of k higher than 50, even higher than 200, e.g. 256 (for 8-bits encoding of the grayscale values). For example, the method works.

The method produces optimal quantization of the geographical statistical data so that the color mapping layers are optimal (with respect to the "total distortion", which is the standard objective function), being faster than the nowadays other optimal quantizers. In fact, the computation time of the method is comparable (and often even faster) than the best heuristic methods (that produce non-optimal quantization).

At this point, the context of the method and many examples thereof have been provided, but details on the core of the method (i.e. the computing S20 step that defines the later design S30-S40) have not been provided yet. This is done hereunder, being noted that all implementation examples provided below may be applied in any of the example applications provided above.

As indicated before, the method comprises a step of computing S20 the optimal K-means clustering of the numerical values for a predetermined number K of clusters. But this is not done brutally. Indeed, the computing step S20 includes iterating a linear-time Row Minima Searching algorithm a number of times corresponding to K (K−1 times in an example discussed later). Thanks to its use of any predetermined linear-time algorithm of the well-known category of Row Minima Searching algorithms, the computing step S20 has a low complexity. The method thus implements a new and algorithmically efficient solution of the K-means clustering problem.

Before providing more details on the computing step S20, the quantization is now discussed. Indeed, in an example, the statistical values may be in a way "quantized" before S30-S40. Indeed, the statistical values of each area may be seen as replaced by the center of the cluster to which the area is associated by the method, as their corresponding areas are applied the coloration of the cluster.

As known, scalar Quantization is a computational tool that approximates real values using a finite set $V=\{c_1, \ldots, c_K\} \subset \mathbb{R}$, where the elements of V, called digital steps, are the values that are used as approximations. A scalar quantizer is mathematically defined as a mapping:

$$q: \mathbb{R} \to V = \{c_1, \ldots, c_K\},$$

such that the distance between x and q(x) is small, the distance being any predetermined distance (where the notion of distance may depend on the context), such as the Euclidian distance.

In practice, scalar quantizers are always defined through a partition of $\mathbb{R}$ into intervals $I_1 = ]-\infty, a_1[$, $I_2 = [a_1, a_2[, \ldots, I_K = [a_{K-1}, \infty[$ (with $a_1 < \ldots < a_{K-1}$) and then to each $x \in \mathbb{R}$, denoting $I_i$ the only interval such that $x \in I_i$, we associate the value $q(x) = c_i$. The real numbers $a_1, \ldots, a_{K-1}$ are called "decision bounds". The article of Gray and Neuhoff, "*Quantization*", provides a complete survey of quantization.

The method focuses on the K-means setting, as widely known and defined for example in the article of MacQueen, "*Some Methods for classification and Analysis of Multivariate Observations*", which is the most widely used. In this setting, the method finds at S20, for a given tuple $(x_1, \ldots, x_n) \in \mathbb{R}^n$ sorted in increasing order and for a given integer K (typically, $K = 2^b$ where b is the number of bits available to encode each $x_i$), a quantizer q using K digital steps that achieves a minimal total distortion, the total distortion being defined as:

$$TD(q) = \sum_{1 \le i \le n} (x_i - q(x_i))^2$$

It is clear that to minimize this quantity the method may only deal with quantizers that map each real value x to its closest digital steps. Hence the problem is just equivalent to finding the K centers $c_1, \ldots, c_K$ that minimize:

$$TD(\{c_1, \ldots, c_K\}) = \sum_{1 \le i \le n} \min_{1 \le k \le K} (x_i - c_k)^2$$

Figure 4:
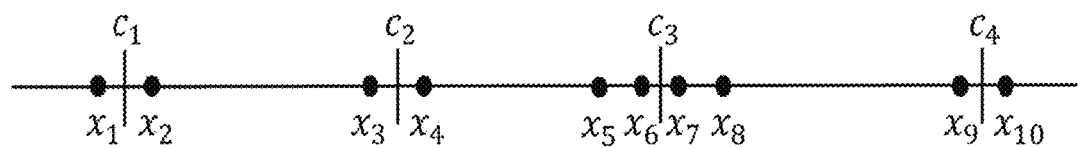

FIG. 4 shows an example for ten values and 4 digital steps. An optimal quantization is given by a set $\{c_1, \ldots, c_K\}$ such that: $\forall c_1', \ldots, c_K', TD(\{c_1', \ldots, c_K'\}) \ge TD(\{c_1, \ldots, c_K\})$.

Minimizing this total distortion has to be understood as losing as few information as possible during the quantization step (for a given K). Note that, each point $x_i$ being implicitly assigned to its nearest center, the method may thus be constructing a partition into clusters where each cluster corresponds to the set of points assigned to a given center (finding the best quantizer is thus a clustering problem, as explained by Lloyd in "*Least square quantization in PCM*"). For each $k \in \{1, \ldots, K\}$, let us denote by $C_k$ the cluster that corresponds to the center $c_k$. It is easy to see that each center is in fact the mean of the points of its corresponding cluster. It is moreover noted that, since it is assumed that $x_1 < \ldots < x_n$, each cluster consists in a contiguous subset of points. For example, if we have 47 real numbers that we want to partition in K=4 clusters, a possible optimal clustering could be:

$$\left( \underbrace{[x_1, \ldots, x_{17}]}_{c_1}, \underbrace{[x_{18}, \ldots, x_{24}]}_{c_2}, \underbrace{[x_{25}, \ldots, x_{42}]}_{c_3}, \underbrace{[x_{43}, \ldots, x_{47}]}_{c_4} \right)$$

For all $1 \le a \le b \le n$, we introduce the notation $$\text{mean}(a, b) = \frac{1}{b - a + 1} \sum_{\{a \le i \le b\}} x_i$$

and we also denote disto $(a, b) = \sum_{\{a \le i \le b\}} (x_i - \text{mean}(a, b))^2$. The corresponding total distortion of the previous example can be written:

$TD = \text{disto}(1,17) + \text{disto}(18,24) + \text{disto}(25,42) + \text{disto}(43, 47)$ As mentioned earlier, solutions for this problem already exist, but they are slower than the method and for most of them are just heuristic (i.e. do not produce the optimal quantization).

In an example implementation of the method, the numerical values ($x_1, \ldots, x_n$) are sorted and indexed accordingly. The iterating within the computing step S20 includes, at each respective iteration rank k, and for each respective index j inferior to the number n of numerical values, the computation of the minimal total distortion, noted $TD_{min}(j, k)$, achievable for the subset of numerical values $x_i$ indexed lower than j (thus i≤j), with a number of clusters k corresponding to the respective iteration rank (thus, k), according to the linear-time Row Minima Searching algorithm applied to the square matrix H.

In this example, at each respective iteration rank k, and for each respective index j inferior to the number n of numerical values, for each row index i and each column index j, the matrix entry H(i,j)) may simply correspond (e.g. be equal to) to a sum of:
- the minimal total distortion ($TD_{min}(i-1,k-1)$) computed at the previous iteration for the index (i−1) preceding the row index, and
- the distortion (disto(i,j)) of the contiguous subset ($x_i, \ldots, x_j$) of the numerical values between the row index and the column index.

Such implementation provides a system that outperforms existing clustering methods since it also produces the optimal K-means clustering but runs fasters, specifically in time O(K*n). It is noted that, for typical uses, the method of the example performs more than ten times faster than "good" heuristics.

A more complete Overview of the clustering algorithm of the example is now discussed.

In order to compute the optimal partition, the method uses the Dynamic Programming paradigm (as described in the article of Bellman, "*The theory of dynamic programming*"). In particular, the method of the example computes for each j∈{1, ..., n} and each k∈{1, ..., K}, the value $TD_{min}(j,k)$ defined as the minimal total distortion that we can achieve with at most k clusters if we only consider the j first points ($x_1, \ldots, x_j$).

By definition, we have for all j∈{1, ..., K}: $TD_{min}(j,1)$= disto(1,j), since the only way to partition a set of points in one cluster is to take them all. Moreover we have the following formula, for all k∈{2, ..., V} and for all j∈{1, ..., n}:

$$TD_{min}(j, k) = \min_{1 \leq i \leq j} \{TD_{min}(i - 1, k - 1) + disto(i, j)\}$$

This formula expresses the fact that the minimal total distortion that we can achieve for ($x_1, \ldots, x_j$) with at most k clusters consists, for a certain i, in an optimal clustering of the i−1 first points with at most k−1 clusters and [$x_i, \ldots, x_j$] as final cluster. The previous formula is at the core of the method. Remark that if one has, for a given k∈{2, ..., K}, computed the values $TD_{min}(j,k-1)$ for all j, then one could compute for all j the value $TD_{min}(j,k)$ by testing all possible i∈{1, ..., j} in the previous formula. However this hypothetical technique would lead to a very slow algorithm.

In order to overcome this, the method uses a particular category of algorithms for Row Minima Searching in particular matrices.

The concepts of Row Minima Searching and Total monotonicity on which the method of the example relies are now discussed.

A Row Minima Searching algorithm is (as detailed in the article of Bradford and Reinert, "*Lower Bounds for Row Minima Searching*", 1996) an algorithm that takes as input a function $f: [\![1,R]\!] \times [\![1, C]\!] \to \mathbb{R}$ such that for all 1≤i≤R, 1≤j≤C, the value $f(i,j)$ can be computed in constant time, and outputs a vector of integers p=($p_1, \ldots, p_R$) such that:

$$\forall 1 \leq i \leq R, p_i = \text{argmin}_{1 \leq j \leq C} f(i,j)$$

In the following we denote by F the matrix $F=(f(i,j))_{i,j}$. It is noted for the sake of completeness that if the matrix F has no particular property, then one may ask for all its entries in order to compute the vector p. However, under certain conditions on F, one can implement algorithms that are drastically faster.

The matrix F is called totally monotone if it satisfies the following condition: "For i,j,k with i<j, if we have F(k,i)<F(k,j) then for all k'≤k we also have F(k',i)<F(k', j)."

There exist linear-time algorithms for Row Minima Searching in Totally Monotone Matrices (as explained in the article by Alon and Azar, "*Comparison-Sorting and Selecting in Totally Monotone Matrices*"). Any of such predetermined algorithms (i.e. linear-time Row Minima Searching algorithm) may be implemented by the method at S20 on matrix H. In particular, the Inventor has tested the method using the widely known SMAWK algorithm, presented in the paper of Alon and Azar, with dramatically fast convergence (relative to the prior art).

The fundamental property that allows the method to perform dramatically fast will now be discussed. Before that, it is noted that the identification of this property leads to the creation of a bridge between the K-means clustering problem and the widely known and powerful algorithms provided for Row Minima Searching, and that the long history of research on K-means clustering has never identified such a bridge.

Theorem:

For all 1≤i<j<n, we have: disto(i,j)+disto(i+1,j+1) disto (i,j+1)+disto(i+1,j).

Demonstration:

First of all, remark that for 1≤a<b<n, disto(a, b) is by definition equal to the variance of ($x_a, \ldots, x_b$) multiplied by (b−a+1).

Therefore, we have from the König-Huygens formula that:

$$disto(a, b) = \sum_{a \leq i \leq b} x_i^2 - \frac{1}{b - a + 1}$$

Let us consider i and j such that 1≤i<j<n.
Denoting p=(b−a+1), $S=\Sigma_{1 \leq l \leq j} x_l$, $\alpha=x_{j+1}$ and $\beta=x_i$, we have from the previous identity:

$$disto(i, j) = \sum_{i \leq l \leq j} x_l^2 - \frac{S^2}{p}$$

$$disto(i, j+1) = \sum_{i \leq l \leq j+1} x_l^2 - \frac{(S + \alpha)^2}{p + 1}$$

And therefore:

$$disto(i, j+1) - disto(i, j) = \alpha^2 + \frac{S^2}{p} - \frac{(S + \alpha)^2}{p + 1}. \quad (1)$$

We have moreover:

$$disto(i+1, j) = \sum_{i \leq l \leq j} x_l^2 - \frac{(S-\beta)^2}{p-1}$$

$$disto(i+1, j+1) = \sum_{i \leq l \leq j+1} x_l^2 - \frac{(S-\beta+\alpha)^2}{p}$$

And therefore:

$$disto(i+1, j) - disto(i+1, j+1) = -\alpha^2 - \frac{(S-\beta)^2}{p-1} + \frac{(S-\beta+\alpha)^2}{p}. \quad (2)$$

Let us denote $\Delta = disto(i,j+1) - disto(i,j) + disto(i+1,j) - disto(i+1,j+1)$ The theorem we want to prove is then simply equivalent to $\Delta \geq 0$.

Moreover, adding equation (1) and (2), we obtain that:

$$\Delta = \frac{S^2}{p} - \frac{(S+\alpha)^2}{p+1} - \frac{(S-\beta)^2}{p-1} + \frac{(S-\beta+\alpha)^2}{p}$$

Our goal is now to use this expression to show that $\Delta \geq 0$.

Without loss of generality, we can assume that $S=0$ since the problem is invariant by translation (it corresponds to translate all the points by $$-\frac{S}{p}\Big),$$

such that we have:

$$\Delta = -\frac{\beta^2}{p-1} - \frac{\alpha^2}{p} + \frac{(\alpha-\beta)^2}{p}$$

$$= \frac{1}{p(p-1)(p+1)}\Delta'$$

With $$\Delta' = -p(p+1)\beta^2 - p(p-1)\alpha^2 + (p-1)(p+1)(\alpha-\beta)^2$$

Grouping the terms, we can write:

$$\Delta' = (p+1)\beta^2 + (p-1)\alpha^2 - 2(p+1)(p-1)\alpha\beta$$

Now remark that $S = x_i + \ldots + x_j = \beta + \ldots + \alpha \leq \beta + (p-1)\alpha$ since $\alpha \geq x_l$ for all $l \in \{i+1, \ldots, j\}$ (remember that $x_1 < \ldots < x_n$). Since we assumed that $S=0$, we get that:

$$(p-1)\alpha \geq -\beta$$

Moreover we clearly have $\beta \leq 0$ since it is the smaller term of the sum S that is null, so it follows that $$-(p-1)\alpha\beta \geq \beta^2$$

Reinjecting this inequality in the last expression of $\Delta$ we obtain that:

$$\Delta' = (p+1)\beta^2 + (p-1)\alpha^2 + 2(p+1)\beta^2 \geq (p-1)\alpha^2 + (p+1)\beta^2$$

Hence we have $\Delta' \geq 0$ and consequently $\Delta \geq 0$, which concludes the proof. □

Now, for a fixed $k \in \{2, \ldots, K\}$, assume that the method has computed all the $TD_{min}(j,k-1)$ for all j. Let us recall that the $(TD_{min}(j,k))_j$ can be retrieved for all j through the relation:

$$TD_{min}(j, k) = \min_{1 \leq i \leq j}\{TD_{min}(i-1, k-1) + disto(i, j)\}$$

We will now see how the above-stated property will help the method compute all the $(TD_{min}(j,k))_j$ from the $(TD_{min}(j, k-1))_j$ in time $O(n)$.

First let us denote $H(i,j) = TD_{min}(i-1, k-1) + disto(i,j)$.

Since $disto(i,j) + disto(i+1,j+1) \leq disto(i,j+1) + disto(i+1,j)$, we obtain by adding on both sides $TD_{min}(i-1, k-1) + TD_{min}(i, k-1)$ that:

$$H(i,j) + H(i+1,j+1) \leq H(i,j+1) + H(i+1,j)$$

This property is called the Monge's property (see the article by Cechlárová and Szabó, "*On the Monge property of matrices*") of the matrix $H = (H(i,j))_{i,j}$ (in fact the method may discard the definition of $H(i,j)$ when $j < i$ but such a missing value is not a problem in practice, and this is not further discussed). In some literature, it is also known as a Knuth-Yao quadrangle inequality (see for example the article of Bein, Golin, Larmore, and Zhang, "*The Knuth-Yao quadrangle-inequality speedup is a consequence of total-monotonicity*").

By Theorem, the matrix H is totally monotone, i.e: if for i,j,k with $i < j$ we have $H(k,i) < H(k,j)$ then for all $k' \leq k$ we also have $H(k',i) < H(k', j)$. This is actually a well-known property of Monge's matrices and does not need to be proved.

Now, remark that computing the $(TD_{min}(j,k))_j$ is equivalent to computing the minimum of each of the rows of matrix H. Here the method of the example invokes any predetermined linear-time Row Minima searching algorithm (such as the SMAWK algorithm), which happens to be exactly designed for this sub-problem that it solves in time $O(n)$. Remark that the matrix H is of size n×n but the method does not need to construct it entirely. The method may just provide e.g. to the SMAWK subroutine a way to compute any H entry in constant time.

So in practice, the algorithm of the method may first compute the first layer $(TD_{min}(j, 0))_j$, then it will compute the second layer $(TD_{min}(j, 1))_j$ using the Row Minima Searching (RMS) subroutine, and then compute the third layer $(TD_{min}(j, 2))_j$ using a second time the RMS algorithm and so on, until the method gets all the $(TD_{min}(j,k))_{j,k}$. Since each of the K layers costs a time $O(n)$ to be computed, the whole algorithm runs in time $O(Kn)$.

At this point, in an example, the method may further comprises, at each respective iteration rank k, storing the indices returned by the Row Minima Searching algorithm, for example in a dedicated matrix $Cut_{min}$. The method of this example may further include, at the computing step S20 determining the optimal clustering from the stored indices.

In a simple and direct implementation, determining the optimal clustering from the stored indices comprises working within matrix $Cut_{min}$. In specific, the method of the example iteratively partitions the numerical values, starting from the last indexed numerical value ($Cut_{min}(n,K)$). At each respective iteration rank q, the index of the starting numerical value of the currently formed cluster is equal to the index that was stored (during the iterating within the computing step S20), at the iteration of rank K-q.

Indeed, if one remarks that each time the method computes a minimum, it is clear that the method may also get the index that reaches this minimum. More precisely, each value of $(TD_{min}(j,k))_{j,k}$ is computed as a minimum whose index can be stored in a matrix $(Cut_{min}(j,k))_{j,k}$. From that the method can easily get the optimal partition only looking at the table $Cut_{min}$.

The invention claimed is:

1. A computer-implemented method of designing a choropleth map, the method comprising:
providing a map, and a number (n) of numerical values $(x_i, \ldots, x_n)$ that represent a statistical variable at respective areas of the map;
computing the optimal K-means clustering of the numerical values for a predetermined number (K) of clusters, wherein the computing includes iterating, a number of times corresponding to the predetermined number of clusters, a linear-time Row Minima Searching algorithm applied to a square matrix (H) of order (n) equal to the number of numerical values;
assigning a respective coloration to each cluster of the computed clustering; and
at all areas of the map at which a respective numerical value is provided, applying the coloration assigned to the cluster to which the respective numerical value belongs.

2. The method of claim 1, further comprising providing a predetermined color, and the coloration assigned to a respective cluster is an intensity of the predetermined color that depends on the numerical values of the respective cluster.

3. The method of claim 2, wherein the coloration assigned to a respective cluster is an intensity of the predetermined color that increasingly depends on the value of the center of the respective cluster based on a predetermined increasing relationship between a predetermined ordered and one-dimensional set of values of coloration and values of the statistical variable.

4. The method of claim 1, wherein the numerical values $(x_1, \ldots, x_n)$ are sorted in an increasing order and indexed such that $x_1 < \ldots < x_n$, and the iterating within the computing includes, at each respective iteration rank (k), and for each respective index (j) inferior to the number (n) of numerical values, the computation of the minimal total distortion $(TD_{min}(j,k))$ achievable for the subset of numerical values $(x_i)$ indexed lower than the respective index (i<=j), with a number of clusters corresponding to the respective iteration rank (k), according to the linear-time Row Minima Searching algorithm applied to the square matrix (H).

5. The method of claim 4, wherein, at each respective iteration rank (k), and for each respective index (j) inferior to the number (n) of numerical values, for each row index (i) and each column index (j), the square matrix entry (H(i,j)) corresponds to a sum of:
the minimal total distortion $(TD_{min}(i-1,k-1))$ computed at the previous iteration for the index (i-1) preceding the row index, and
the distortion (disto(i,j)) of the contiguous subset $(x_1, \ldots, x_j)$ of the numerical values between the row index and the column index.

6. The method of claim 5, further comprising, at each respective iteration rank (k), storing indices $(Cut_{min}(j,k))$ returned by the linear-time Row Minima Searching algorithm.

7. The method of claim 6, wherein the computing further includes determining the optimal clustering from the stored indices.

8. The method of claim 7, wherein determining the optimal clustering from the stored indices comprises iteratively partitioning the numerical values, starting from the last indexed numerical value $(Cut_{min}(n,K))$ in the stored indices $(Cut_{min})$, wherein at each respective iteration rank (q), the index of the starting numerical value of the currently formed cluster is equal to the index stored, during the iterating within the computing, at the iteration of rank (K-q) equal the predetermined number of clusters minus the respective iteration rank (q) for the row index equal to the index of the last indexed numerical value of the currently formed cluster.

9. A non-transitory data storage medium having recorded thereon a computer program comprising instructions for performing a computer-implemented method of designing a choropleth map, the method comprising:
providing a map, and a number (n) of numerical values $(x_1, \ldots, x_n)$ that represent a statistical variable at respective areas of the map;
computing the optimal K-means clustering of the numerical values for a predetermined number (K) of clusters, wherein the computing includes iterating, a number of times corresponding to the predetermined number of clusters, a linear-time Row Minima Searching algorithm applied to a square matrix (H) of order (n) equal to the number of numerical values;
assigning a respective coloration to each cluster of the computed clustering; and
at all areas of the map at which a respective numerical value is provided, applying the coloration assigned to the cluster to which the respective numerical value belongs.

10. A system comprising:
a processor coupled to a memory, the memory having recorded thereon a computer program comprising instructions that, when executed, cause the processor to
provide a map, and a number (n) of numerical values $(x_1, \ldots, x_n)$ that represent a statistical variable at respective areas of the map,
compute the optimal K-means clustering of the numerical values for a predetermined number (K) of clusters, wherein computing includes iterating, a number of times corresponding to the predetermined number of clusters, a linear-time Row Minima Searching algorithm applied to a square matrix (H) of order (n) equal to the number of numerical values,
assign a respective coloration to each cluster of the computed clustering, and
at all areas of the map at which a respective numerical value is provided, apply the coloration assigned to the cluster to which the respective numerical value belongs.

11. A non-transitory data storage medium having recorded thereon a choropleth map obtainable by a computer-implemented method of designing a choropleth map, the method comprising:
providing a map, and a number (n) of numerical values $(x_1, \ldots, x_n)$ that represent a statistical variable at respective areas of the map;
computing the optimal K-means clustering of the numerical values for a predetermined number (K) of clusters, wherein the computing includes iterating, a number of times corresponding to the predetermined number of clusters, a linear-time Row Minima Searching algorithm applied to a square matrix (H) of order (n) equal to the number of numerical values;
assigning a respective coloration to each cluster of the computed clustering; and at all areas of the map at which a respective numerical value is provided, applying the coloration assigned to the cluster to which the respective numerical value belongs.

* * * * *